T. F. MORRIS.
TRIMMER FOR SEWING MACHINES.
APPLICATION FILED DEC. 12, 1916.
1,319,668.
Patented Oct. 21, 1919.
4 SHEETS—SHEET 3.
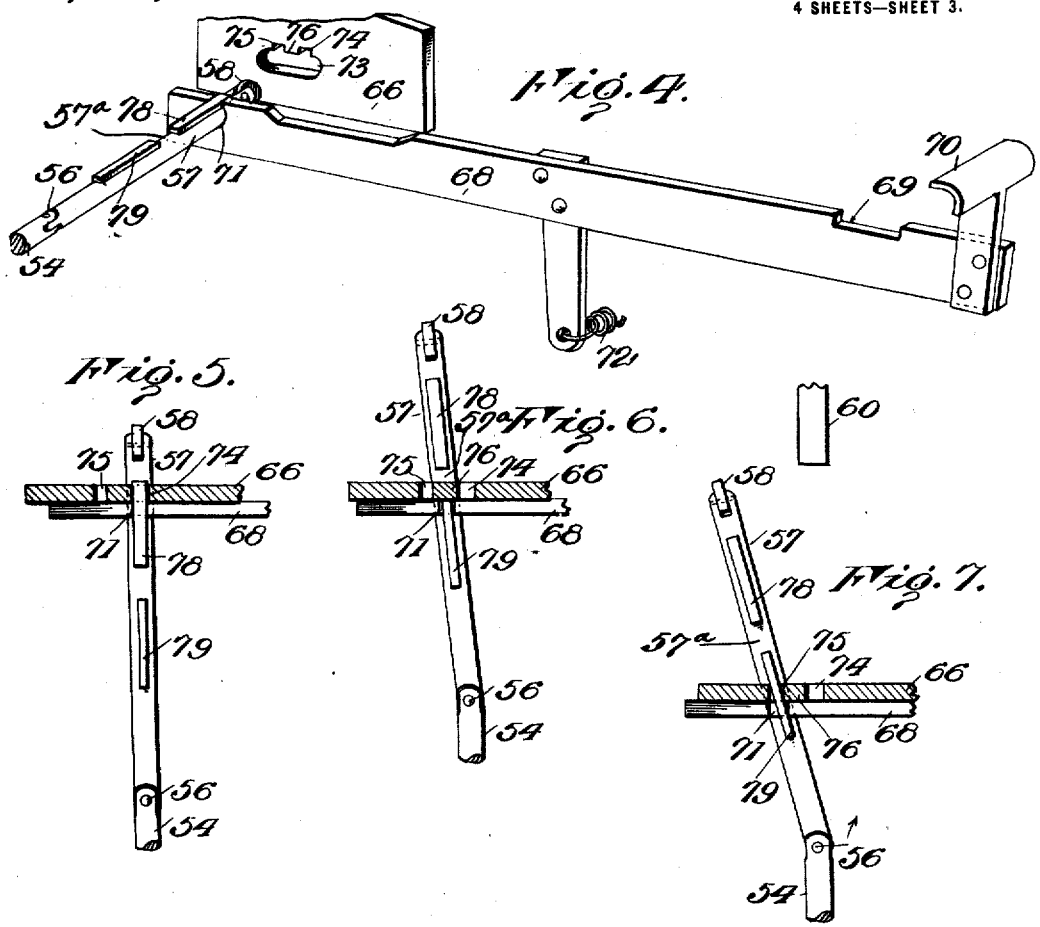
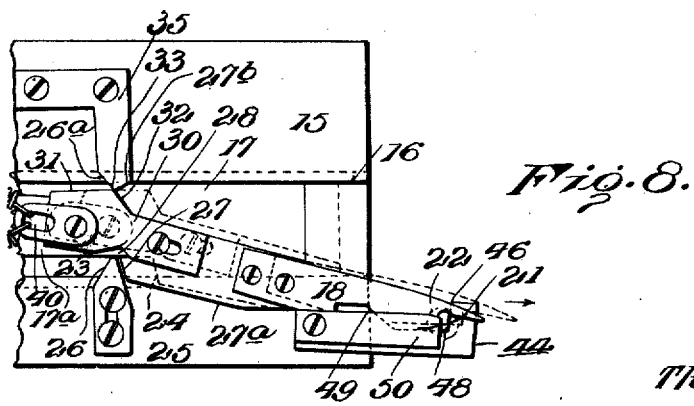
Inventor
Thomas F. Morris
By
Attorney T. F. MORRIS.
TRIMMER FOR SEWING MACHINES.
APPLICATION FILED DEC. 12, 1918.
1,319,668.
Patented Oct. 21, 1919.
4 SHEETS—SHEET 4.
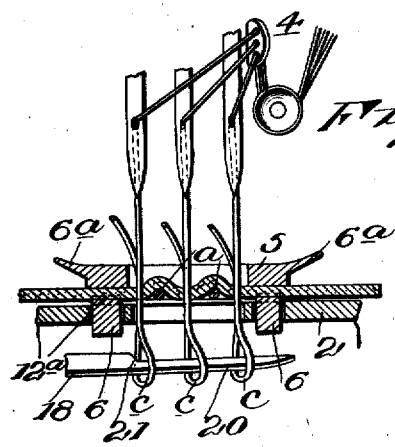
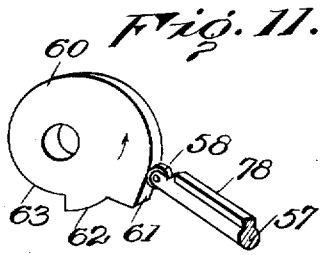
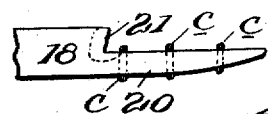
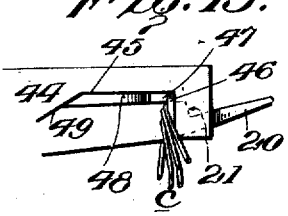
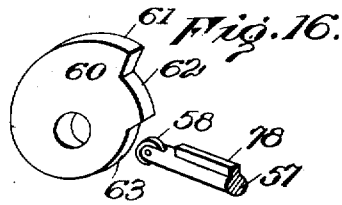
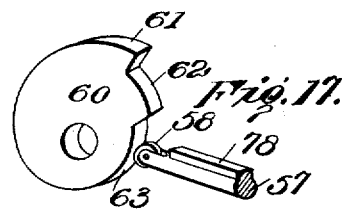
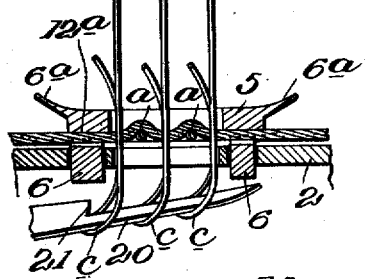
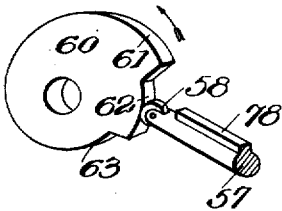
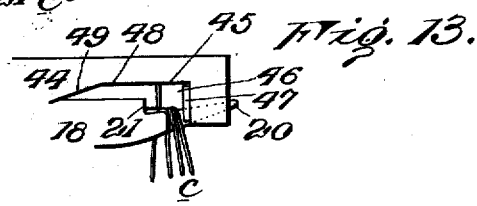
Inventor
Thomas F. Morris
By
Attorney

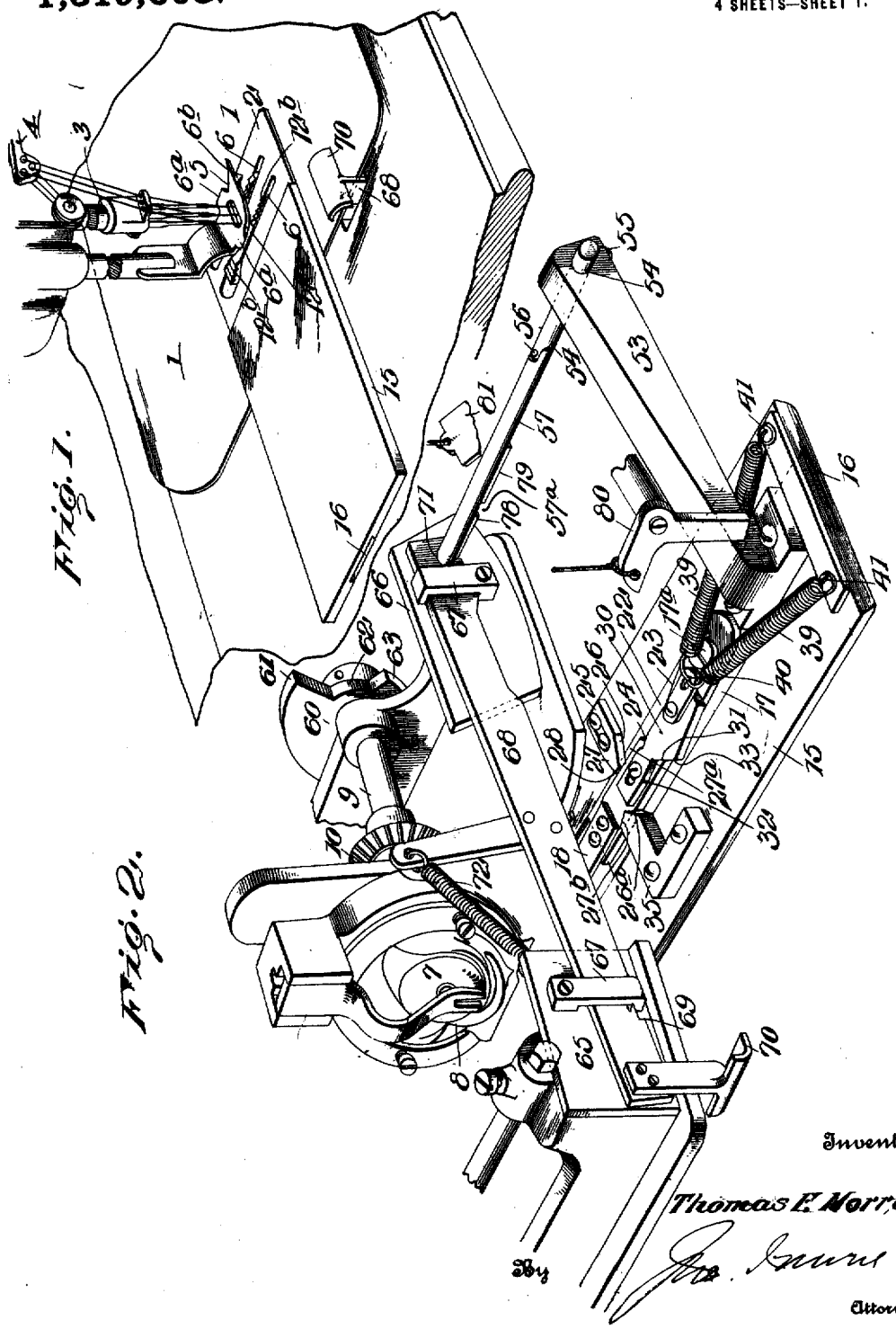

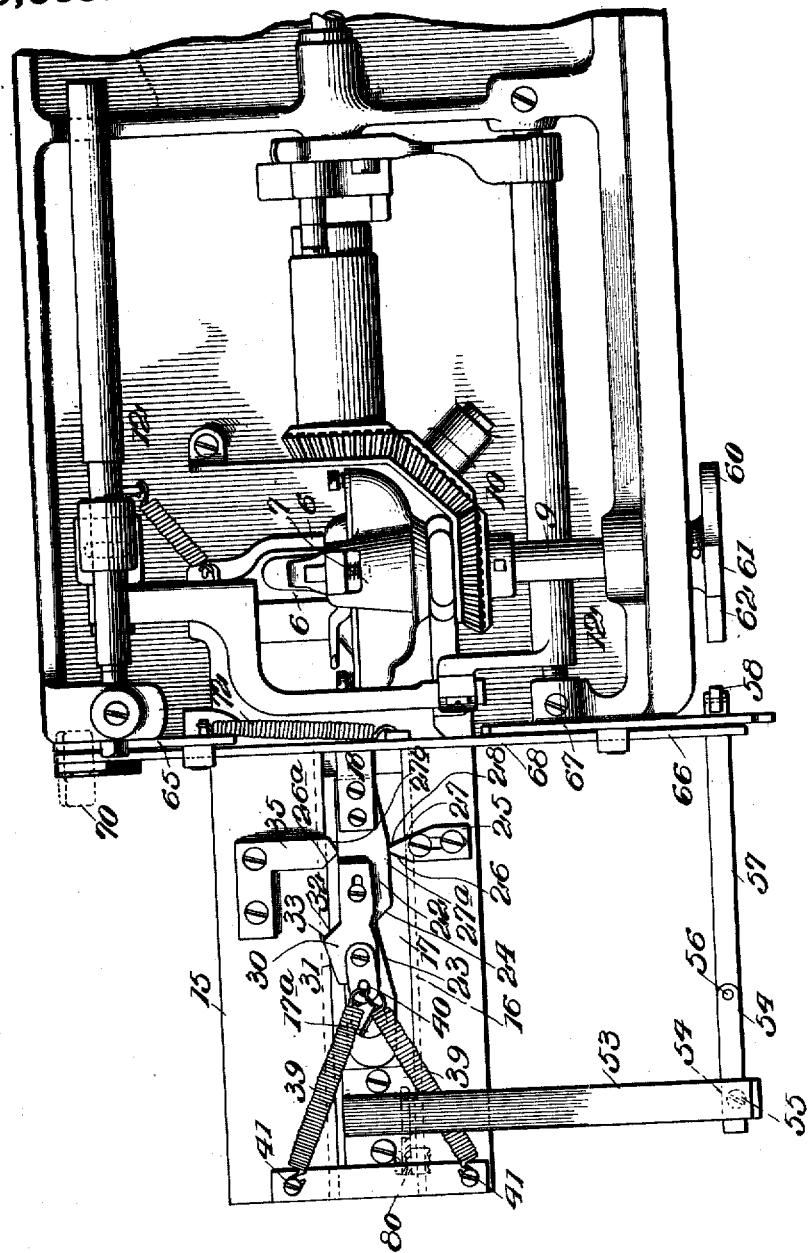

UNITED STATES PATENT OFFICE.

THOMAS F. MORRIS, OF WATERFORD, NEW YORK, ASSIGNOR TO THE SINGER MANUFACTURING COMPANY, A CORPORATION OF NEW JERSEY.

TRIMMER FOR SEWING-MACHINES.

1,319,668.     Specification of Letters Patent.     Patented Oct. 21, 1919.

Application filed December 12, 1916. Serial No. 136,478.

*To all whom it may concern:*

Be it known that I, THOMAS F. MORRIS, a citizen of the United States, residing at Waterford, in the county of Saratoga and State of New York, have invented certain new and useful Improvements in Trimmers for Sewing-Machines, of which the following is a specification.

This invention relates to improvements in trimmers for sewing machines, and is designed primarily for machines for forming points on gloves, but is in no way limited to this particular use.

Heretofore, when forming points on gloves, the thread was severed some distance from the work, and on the outside thereof, and then another operator skilled in the art, and by hand, pulled the loose ends of the thread through the material to the underside, and clipped the end comparatively short. Besides requiring the services of two operators to complete the points, and the incidental expense and delay, it frequently happens that in clipping the thread after it has been pulled through the material, the ends are too short, and in case of an elastic fabric these short ends work through to the top surface, which is decidedly objectionable.

According to my invention I dispense with the services of a second operator, by providing means for severing the needle threads under the work, all the ends of the threads being of the same length, hence economizing in the cost of production, and at the same time insuring that all the threads be severed a safe distance from the stitches.

One of the prime objects of my invention is to provide means for entering certain of the loops of the needle thread, drawing the thread laterally to provide sufficient lengths for a subsequent operation, and holding the pulled threads until such time as the needles and take up assume position to insure of the stitches in the material being properly tensioned to hold same tight, and then by subsequent operation sever the threads under the work.

Another object of the invention is to provide a single device for engaging the loops, drawing off the threads, and by subsequent operation sever the threads.

A further object of the invention is to provide a trimmer, and trimming mechanism associated therewith, so that the positioning of the pull off with reference to the loops, the pulling off of the thread, and the subsequent trimming operation, can only take place at a time when the needles and the take up of the sewing machine are in positions that will insure of the proper stitch being effectually drawn into the material.

The invention also aims to provide means and mechanism under control of the operator, for insuring of the first stitch or two being drawn into the material to act as a tie, after the ends of needle threads first passed through the material are severed.

The invention also comprehends improvements in the details of construction and arrangement of parts which will be hereinafter described and particularly pointed out in the claims.

In the drawings:

Figure 1 is a detail perspective view of a part of a sewing machine, illustrating the application of my invention.

Fig. 2 is a similar view, the machine being inverted.

Fig. 3 is a bottom plan view.

Fig. 4 is a detail view of the finger operated lever for interrupting the usual cycle of movement of the trimmer.

Fig. 5 is a detail plan view showing the normal position of the cam rod and the finger lever.

Fig. 6 is a similar view showing the cam rod locked by the finger lever preparatory to actuation by the cam.

Fig. 7 is a similar view showing the position of the rod and lever when trimming the thread, at the beginning of the stitching operation.

Fig. 8 is a bottom plan view in full lines of the thread engaging finger in position when pulling the loops laterally, and in dotted lines when in cutting position.

Fig. 9 is a diagrammatic section illustrating the thread engaging finger engaging the loops of the needle thread.

Fig. 10 is a plan view of the thread engaging finger engaging the loops, as in Fig. 9.

Fig. 11 is a view of the cam and rod, positioned when the thread engaging finger is in the loops, as shown in Fig. 9.

Fig. 12 is a view similar to Fig. 9, but showing the thread engaging finger in position to pull the loops laterally.

Fig. 13 is a plan view of the finger in the position shown in Fig. 12.

Fig. 14 is a view of the cam and its rod in position when the finger is in the position shown in Fig. 12.

Fig. 15 is a plan view of the knife and finger in cutting position.

Fig. 16 is a view of the cam and rod, when the finger is in the position shown in Fig. 15, the rod having been laterally moved by the finger piece, as in Fig. 7.

Fig. 17 is a view similar to Fig. 16, but showing the rod in engagement with the cam, as when performing the usual cycle of movement when trimming lock stitches.

1 indicates a sewing machine, 2 the throat plate, 3 the needle bar, 4 the take up arm, 5 the presser foot, 6 the feed bars, 7 the bobbin, 8 the looper, 9 the looper shaft, 10 the gearing, 12 the shafts to impart the necessary movement to the feed bars 6. These features are conventionally illustrated, and form no specific part of my invention, except as to the presser foot and feed bars, and are only shown and referred to, to obtain a comprehensive understanding of the improvement. It may be here stated that three needles are shown, as double cords are used in making the points, but it is to be understood that this is in no wise a limitation, as the invention is applicable to one or a series of needles.

The presser foot 5 is formed with gages 6ª, on opposite sides, and a central gage 6ᵇ, to assist the operator in placing the material to properly locate the points. One of the feeding bars has a flat surface 12ª between the usual serrations 12ᵇ, the needle thread being clamped between the flat surface and the presser foot.

15 indicates a plate extending laterally from the base of the sewing machine, about in line with the throat plate, and on the underside of which the substantial parts of the improvement are mounted. Formed in the underside of the plate 15, is dovetail groove 16, and mounted to be reciprocated therein is slide 17. Pivoted at 17ª, to the underside of the slide 17, is a cam 22, having a long angular surface 23, and a short abrupt surface 24, disposed acutely to the surface 23.

Coöperating with this cam is a cam lug 25, fixed to the underside of the plate 15, and provided with two oppositely inclined cam surfaces 26 and 27, which terminate in substantially a point 28. Normally the point 28 rises against the edge 27ª, of the cam 22, until other movements and instrumentalities come into play to cause coöperation with the cam surfaces 23 and 24.

30 designates a cam disposed opposite the cam surfaces 23 and 24, and projecting laterally from the opposite edge of the cam 22. The cam 30 is formed with an angularly disposed cam surface 31, and a second but shorter cam surface 32, both merging into a substantial point 33. A cam lug 35 is fastened to the underside of the plate 15, to coöperate with surfaces of the cam 30. The fixed cam lug 35 is provided with two cam surfaces 26ª and 27ᵇ, the lug normally bearing against one edge of the cam plate 22, and forming with the cam lug 25, a guide way.

Two springs 39 are fastened to a post 40, extending from the cam 30, and to screws 41 on the plate 15, the springs serving to turn the cam plate 22 on its pivot to normal position, or between the two cam lugs 25 and 35, as shown in Fig. 3. Projecting from the inner end of the cam 22 is a finger 18, which is reduced and pointed at its end to form a thread engaging member 20, and a shoulder 21, the thread engaging member operating in its longitudinal movement in a plane with the looper.

Secured to the under side of the plate 15, and at the inner end thereof, some distance from the slide 17, is a knife member 44. This member is provided with a depression 45, the transverse edge 46 of which is sharpened to form a cutting edge or knife 47. The longitudinal edge 48, of the depression extends a short distance from the knife edge, then the opposite wall of the depression inclines outwardly, as at 49. Secured to the underside of the knife member is a spring plate 50, shown in Fig. 8, which coöperates with the thread engaging member in the operation of trimming the thread, and is so disposed to exert pressure on the finger to insure same snugly fitting against the underside of the knife member.

Extending laterally from a point near the outer end of the slide 17, is an arm 53, formed near one end with an opening, in which is mounted a sectional rod 54. This rod is held in adjusted position in the opening by a screw 55. Hinged on vertical pin 56, at the inner end of the rod section 54, is a rod section 57, carrying at its end a roller 58.

Mounted on the looper shaft 9, is a cam disk 60, the periphery of which has cam surfaces 61, 62, and 63, Figs. 11, 14, 16 and 17, with which the roller 58 coöperates.

By reference to the drawing it will be seen that the sectional rod 54 is normally in line with the edge of the cam disk, in order that the various movements of the trimmer may be effected to accomplish the desired result. It has been found desirable to interrupt the usual cycle of movements occasioned by the cam surfaces on the disk, and to accomplish this result, it is essential to provide means for displacing the rod section 57, to avoid the cam surface 63.

On one end of the base of the sewing machine, are two plates 65 and 66, and on each is a guide 67. Mounted in the guides 67, is a lever 68, having an edge cut away to form a lug 69, and provided at its outer end a finger piece 70, the inner end of the lever being formed with an opening 71, through which freely passes the rod section 57. The lever is held in a normal or forward position in its guides by a spring 72. The plate 66 is provided with an elongated opening 73, one wall of which is provided with two notches 74 and 75. The metal, which separates these notches, serves as a means for preventing operation of the trimmer at the wrong time, as will later appear.

Near the inner end of the rod section 57, is a spline 78, which engages in the notch 74, and in line with this spline, and spaced therefrom is another spline 79, which is narrower in cross section than the spline 78, and which operates in the notch 75.

Pivoted under the table on which the sewing machine is supported, is bell crank lever 80, one arm of which engages the arm 53, while the other arm of the lever is connected to a foot treadle 81, to afford means for the operator to actuate the trimmer at any time during the stitching operation, the needle of course having been first positioned before the cutting action is effected.

In operation, the parts are assembled as shown, that is, the plate 15 is so positioned that the finger 18 will be in line with the needle loops c.

It may be stated that the specific form of lock stitch employed is wholly an immaterial factor, the only feature to be understood in the application of the invention as illustrated, is the fact that "points" on the glove are formed, and the needle threads are trimmed under the material.

The operator places the material under the presser foot, and then the latter is lowered, and the needle thread is clamped, between the presser foot and material, which in turn rests on the flat surface on the feed bars, and the cords a, around which the stitches are formed, are located in grooves under the foot. The bobbin thread, and the cords having been secured, the operator turns the hand wheel on the sewing machine, by hand, and drives the needles down through the material and then up to form the loops of the first transverse row of stitches, as shown in Fig. 9. In the meantime the operator presses down on the treadle and the end of the rod section 57 is moved against the tension of the springs 39, to the periphery of the disk 60, Fig. 11, and while the loops are being formed, and the needles are advancing to the position shown in Fig. 9, the cam surface 61 will permit the thread engaging finger to pass through the loops as shown in Fig. 9. Continued rotation of the hand wheel of the sewing machine will position the cam surface 62 Fig. 14 of the disk, opposite the end of the rod section 57, and the latter engages therewith, due to pressure on the treadle. As the slide carrying the sectional rod is moved, the cam surface 32 on the cam 30, engages the cam surface 26$^a$, on the cam lug 35, and rocks the cam 22, on its pivot and positions the cam surface 24 against the inclined cam surface 27, on the cam lug 25, as shown in Fig. 8. By this movement, the loop engaging finger is thrown from its longitudinal position between the loops, to a lateral position on the knife member, and under the spring 50. This movement pulls the loops over to provide sufficient thread for the next stitch, as shown in Fig. 12, and at this time the take up is taking up the slack, and the stitch is drawn tight in the material, the free ends of the threads, however, project above the face of the material being held by the presser foot against the fabric support to insure the first stitches being drawn tight in the material. It is at this point in the operation, the usual cycle of movement must be broken, in order to effectually tighten the threads in the material at the beginning of the "point" to prevent unraveling, it having been found desirable to form a second stitch before operating the trimmer. The operator still continues to press on the foot treadle, and the movement of the cam disk is still under the control of the operator through the handwheel. When the thread engaging finger is in the position shown in Figs. 12 and 13, and the thread has been tightened by the take-up, the hand wheel is turned and another or second row of transverse stitches is formed, but as the thread engaging finger is now to one side of the plane of the loops, the second row of loops are or can be drawn up and around the cords a. This second stitch simply serves to hold the stitches in the material before the thread is cut. Just before the roller 58 leaves the cam surface 62, the operator pushes the finger piece 70, until the wall of the notch 69 comes up to the stop 67, the space 57$^a$ between the two splines permitting the rod section 57 to pass the lug 76, hence the rod section is swung on its hinge connection and out of alinement with the cam disk, but while in this position the end of the spline 79 is in engagement with the lug 76, Fig. 6, and further movement of the rod is arrested to give the take up opportunity to take up the slack on the second stitch. Now, when the operator observes that the take up has performed its function, the finger piece 70 is pressed down to disengage it from the stop 67, and is at the same time pushed back until the spline 79 comes into registry with the notch 75, Fig. 7, and through the pressure exerted on the foot treadle, the rod is advanced along one side of the cam disk, as shown in Figs. 7 and 16. This movement advances the loop engaging finger and forces the straight edge 21 and the threads, against the knife and trims the thread, the parts at this time being in the position shown in Fig. 15. This operation severs the threads under the fabric, and leaves the short ends free to be drawn out of the material after the point is finished. During this movement the cam surface 31 rides against the cam lug 35, while the cam edge 23 rides against the point of the cam lug 25, to properly guide the finger in its cutting movement.

The purpose of this interruption in the usual cycle of movement is to prevent the cam action severing the threads before the take up acts to tighten the thread in the formation of the second stitch. Otherwise, if the usual cycle of movement is carried out at this time, and several stitches are taken, they tend to pucker the material, and when straightening them, the short loose ends of the threads draw out. This is overcome by taking say two complete stitches, and then cutting the first loops just about the time the take up has tensioned the second stitch.

Two stitches, considering each point, having been formed, and the thread severed, the operator releases pressure on the trimmer treadle, and the springs quickly retract the sectional rod 54, the spline 79 slipping through notch 75. As the wider spline cannot pass through this notch, the rod swings forwardly on its hinge, until spline 79 is in registry with the notch 74, and the parts connected therewith come back to normal position.

When the cam 22 comes back under the influence of the springs 39, the cam edge 24 rides on the cam edge 27, while the cam edge 32 rides on the cam edge 26ª to properly swing the thread engaging finger to its longitudinal position to be drawn back. The operator now applies power, and the sewing machine is operated and a point of desired length is formed. When a point is about completed, power is cut off and the sewing machine is stopped, pressure on the trimmer treadle is applied and the operator turns the sewing machine over by turning the hand wheel, and the rod 54, and the cams are moved to perform their respective functions, as the cam disk 60 rotates. The only difference, however, between this, the usual cycle of operation, and that previously described, is that the finger piece is not brought into play, hence the cam rod 54 moves in a straight line toward the edge of the cam disk. The roller engages the cam edge 61 to position the thread engaging finger in the loops (Fig. 9) the cam edge 62 swings the thread engaging finger laterally to pull off thread for starting the next stitch, (Fig. 10) and the cam edge 63 permits of the loop engaging finger moving against the knife, to sever the thread (Figs. 15 and 17) the needle threads in this instance being drawn up and through the material, while the end of the thread from the stitches is left under the material. Pressure on the treadle is released, and the parts return to normal position, but instead of the rod section 57 having a swing laterally, and the splines passed through the two notches 74 and 75, the two splines travel in a straight line and hence both pass through the single notch 75.

The length of the short severed ends of the stitching threads are of sufficient length to permit them from working through the material, or pulling out. The stitches are, of course pulled tight in the material, and when the ends are severed under the work it is not necessary to pick, or pull them, or in any wise subsequently cut them. It is of course to be understood that when a point is finished, and the needle threads severed, the operator lifts the presser foot and withdraws the material, and with it sufficient bobbin thread and cord for the next operation.

From the foregoing description it is evident I have provided a thread trimmer which effectually severs the threads under the work, and one which saves the expense of drawing the thread through the material to the under side, and then cutting same, by hand, as now practised. When a point is finished, the operator severs the bobbin thread and cord, and also withdraws the loose free end of the thread left at the beginning of the point, when the knife was first brought into operation.

The trimmer is not of the automatic type, and while its direct operation results from the movements of the various parts, it is nevertheless controlled by the operator, both as to the positioning of the parts to effect the first severing operation, as well as the second severing operation.

It is important to understand that in carrying out my invention, I employ a single element to first enter the loops, draw the threads for the next stitch, and position same adjacent the knife, and subsequently force the thread against the knife to effect the severing. It is also of importance to note that the trimmer can only be operated when the needle is elevated and the controlling means is positioned, the operator manipuating the sewing machine by hand to so position the parts.

Attention is called to the fact that the flat surface on the feed and the presser foot serve a very important function in the operation of trimming. The needle threads are clamped between the flat surface of the feed and the presser foot while the tightening stitches are made, the threads being automatically released at the proper time, that is when the tightening stitches are carried out by the material from under the presser foot.

What I claim is:—

1. In combination, stitch-forming mechanism including a needle and looper and operating means therefor, a thread trimming mechanism comprising a cutter and a trimmer member, the free end of the latter normally in position to enter the needle-loop when formed, means for permitting of the positioning of said trimmer member only through the needle-loop, laterally pulling the loop into coöperative relation with the cutter and subsequently severing the threads of the needle-loop only, and manually operated means for moving the trimmer member into position to be operated.

2. In combination, stitch forming mechanism including a needle, operating means therefor, a trimmer having its end normally positioned to be forced through a needle loop when formed, means operated by the operating means for permitting of the positioning of the trimmer in the needle loop, laterally pulling the loop, and subsequently trimming the thread of the needle loop, and manually operated means for moving the trimmer into position to be operated and including means for interrupting the operation to change the time of one of the movements in the operation of trimming the thread.

3. In combination, stitch forming mechanism, operating mechanism therefor including a shaft, a cam on the shaft, a pivoted and slidably mounted trimmer comprising a thread engaging finger, a knife, a member adapted to be brought into engagement with the cam, manual means for exerting pressure on the member, and cams for laterally moving the thread engaging member, whereby when the cam on the shaft rotates and pressure is applied on the member the said cam will permit the thread engaging finger to enter the loop, and the second mentioned cams will swing the finger and the loop laterally, and the finger will carry the thread to and cause the knife to sever the thread.

4. In combination, stitch-forming mechanism including a needle and operating means therefor, a thread trimming mechanism comprising a stationary cutter and trimmer member, the latter located to one side of the vertical plane of the loop when formed and adapted to be moved through said needle-loop, laterally move said loop and hold it while being tightened, and subsequently move the needle-loop into coöperative relation with the cutter to sever the thread, and manual means for moving the trimmer member.

5. In combination, stitch forming mechanism including a needle, operating means therefor, timing means operable with the means for operating the stitch forming mechanism to determine the time of operation of a thread trimmer, a thread trimmer positioned so that its forward end may be first projected through a needle loop, and manual means for operating the trimmer when the timing means permits.

6. In combination, stitch forming mechanism, operating means therefor, including means for permitting operation of a thread trimmer, a thread trimmer, and manual means for operating the trimmer when the operating means permits, the latter operating means being constructed and timed to cause the trimmer to pass through a loop, laterally move and pull same, and subsequently cause the thread of said loop to be severed.

7. In combination, stitch forming mechanism, operating means therefor, including a disk having a plurality of cam surfaces, a trimmer comprising a slide, a pivoted thread engaging finger on the slide, cams for laterally swinging the thread engaging finger, a fixed knife, and means for bringing the trimmer into relation with the cam surfaces to permit the finger to advance in a loop and engage cams to laterally swing the finger, and subsequently sever the thread on the knife, and means for returning the trimmer to normal position.

8. In combination, stitch forming mechanism, operating means therefor, including a disk having a plurality of cam surfaces, a trimmer comprising a slide, a pivoted thread engaging finger on the slide, cams for laterally swinging the loop engaging finger, a fixed knife, and manual means for bringing the trimmer into relation with the cam surfaces to permit the finger to advance in a loop and engage cams to laterally swing the finger and subsequently sever the thread on the knife, and means for returning the trimmer to normal position.

9. In combination, stitch forming mechanism including a needle, operating means therefor, a trimmer including a thread engaging finger the free end of which is located in front of a needle loop, and operating means for advancing the thread engaging finger into and through the needle loop, laterally swing the finger to draw the loop, subsequently sever the thread of the needle loop only, and means for causing a reversal of the movement of the thread engaging finger.

10. In combination, stitch forming mechanism including a needle, operating means therefor, trimming positioning means operated by the operating means, a trimmer, and manual means for operating the trimmer when brought into relation with the trimmer positioning means including means for laterally moving the trimmer and moving same in thread cutting position, and means for interrupting the thread cutting operation.

11. In combination, stitch forming mechanism, operating means therefor, a throat plate, a trimmer located under the throat plate, manual means for operating the trimmer to advance same through the needle loop and to sever the thread forming the first needle loop under the material being operated upon to cause the free end of the thread forming the beginning of the stitches to be on the under side of the material, and means for retracting the trimmer, said means being operable at the end of the stitching operation to again enter a needle loop and to sever the needle loop thread at the opposite end of the stitches under the material.

12. In combination, stitch forming mechanism, operating means therefor, a throat plate, a manually operated trimmer set in motion in coöperation with the operating mechanism, a cam path to cause the trimmer to enter the loops of the needle thread and to swing laterally to pull the loop and subsequently cause the needle thread to be severed under the material, manual means for changing the time of the severing operation to allow of the formation of a second stitch at the beginning of the stitching operation.

13. In combination, stitch forming mechanism, feed bars one of which is formed with a flat surface, a presser foot, means for operating the stitch forming mechanism, a trimmer, means for permitting of the positioning of the trimmer in the needle loops, laterally pulling the loops and subsequently trimming the thread, the needle thread being held between the presser foot and the flat surface on the feed bar, and manually operated means for moving the trimmer into position to be operated.

14. In a stitch-forming and thread-severing mechanism, the following means in combination having the following sequence of control and operation, means for supporting the fabric being acted on, means for permitting of the piercing of the fabric by the needle; for permitting of the operation of the machine to effect a stitch; means including a member normally located at one side of the plane of a loop when formed to move the first-formed needle-thread loop and to sever same, means for operating the machine to form stitches, and means for permitting of the severing below said support of one arm of the loop of needle-thread completing the stitching operation.

15. In a stitch-forming and thread-severing mechanism, the following means in combination having the following sequence of control and operation, means including a member normally located at one side of the plane of a loop when formed for permitting the securing of the free end of the needle-thread against being drawn below the material by the initial action of the loop-taker at the commencement of the seam formation; for permitting of the operation of the machine to effect a single stitch; for permitting of the severing of one arm of the needle-thread loop first formed; means for operating said machine for the formation of a seam of undetermined length and means for permitting of the severing of one arm of the needle-thread loop at the completion of the seam formation.

16. In combination, stitch-forming mechanism, operating means therefor, a support for the fabric being acted on, a thread trimming mechanism comprising a cutter and trimmer member operating below said support, said trimming member being normally located at one side of the plane of a loop when formed, and means for permitting of the positioning of said member in the needle-thread loop and move the latter laterally into thread-severing engagement with said cutter.

17. In a sewing machine for effecting a straightaway seam, a stitch-forming mechanism, operating means therefor, a support for the fabrics being acted on, a thread trimming mechanism comprising a cutter and a trimmer member located below said support and normally located at one side of the plane of the needle-loop when formed and adapted to be moved through said needle-loop, and means for permitting of the positioning of said member in the needle-thread loop and move the latter laterally into thread severing engagement with said cutter.

18. In a sewing machine, a stitch-forming mechanism, operating means therefor, a support for the fabric being acted on, a thread trimming mechanism comprising a cutter and a trimmer member located below said support and normally out of the transverse path of the thread of the needle-loop and adapted to be moved through said needle-loop only when formed, and means for permitting of the positioning of said member in the needle-thread loop only and move the latter laterally into coöperative relation with the trimmer blade to sever the thread of the needle-thread loop.

19. In a sewing machine, the combination of stitch forming mechanism including a plurality of needles and a looper, a trimmer including a positioning finger and a cutting blade, and manual means for advancing the finger in and through all the needle loops only, laterally moving the loops and subsequently severing only the threads of the needle loops.

20. In a sewing machine, the combination of stitch forming mechanism including a plurality of needles and a single loop taker, a trimmer including a finger, and means for permitting of the advancing the finger in and through the needle loops only, laterally moving all the loops and subsequently severing the threads of the loops only.

21. In a sewing machine, the combination of stitch forming mechanism including a plurality of needles and a single loop taker, a trimmer including a finger, and manual means for permitting of the advancing the finger in and through the needle loops only, laterally moving all the loops and subsequently severing the threads of the loops only.

22. In a sewing machine, the combination of stitch forming mechanism including a plurality of needles for effecting parallel lines of seam formation and a looper, a trimmer including a finger, and means for permitting of the advancing the finger in and through all the needle loops, laterally moving said loops and subsequently severing the threads only of the needle loops.

23. In a sewing machine, the combination of stitch forming mechanism including a plurality of needles, a trimmer including a loop engaging finger, and means for operating the trimmer to cause the finger to engage the first set of needle loops and the last set of needle loops in a series of stitches, move the respective sets of loops and subsequently sever the threads thereof.

24. In a sewing machine, the combination of stitch forming mechanism including a plurality of needles, a trimmer including a loop engaging finger, and manual means for operating the trimmer to cause the finger to engage the first set of needle loops and the last set of needle loops in a series of stitches, move the respective sets of loops and subsequently sever the threads thereof.

In testimony whereof I affix my signature in the presence of two witnesses.

THOMAS F. MORRIS.

Witnesses:
CATHERINE COX,
JOSEPH F. MURPHY.

Copies of this patent may be obtained for five cents each, by addressing the "Commissioner of Patents, Washington, D. C."